US008712630B2

(12) United States Patent
Walwer

(10) Patent No.: US 8,712,630 B2
(45) Date of Patent: Apr. 29, 2014

(54) MOBILE ADVERTISING AND COMPENSATION-VERIFICATION SYSTEM

(76) Inventor: Gregory Walwer, Guilford, CT (US)

( * ) Notice: Subject to any disclaimer, the term of this patent is extended or adjusted under 35 U.S.C. 154(b) by 744 days.

(21) Appl. No.: 12/911,858

(22) Filed: Oct. 26, 2010

(65) Prior Publication Data

US 2011/0106372 A1    May 5, 2011

Related U.S. Application Data

(60) Provisional application No. 61/256,642, filed on Oct. 30, 2009.

(51) Int. Cl.
*G06Q 30/00* (2012.01)
*G01M 17/00* (2006.01)
*G06F 7/00* (2006.01)
*G06F 19/00* (2011.01)

(52) U.S. Cl.
USPC ............. 701/31.4; 705/14.62; 705/14.68; 705/14.69

(58) Field of Classification Search
USPC .......... 701/31.4–31.8, 32.3–32.6, 33.2–34.4; 705/14.4–14.43, 14.49–14.5, 705/14.55–14.58, 14.62–14.69
See application file for complete search history.

(56) References Cited

U.S. PATENT DOCUMENTS

| | | | |
|---|---|---|---|
| 6,236,330 B1 | 5/2001 | Cohen | |
| 6,374,228 B1 | 4/2002 | Litwin | |
| 6,850,209 B2 | 2/2005 | Mankins et al. | |
| 2003/0140536 A1* | 7/2003 | Bilyeu | 40/574 |
| 2003/0236719 A1* | 12/2003 | Meagher et al. | 705/28 |
| 2005/0177416 A1* | 8/2005 | Linden | 705/14 |
| 2011/0040579 A1* | 2/2011 | Havens | 705/4 |

FOREIGN PATENT DOCUMENTS

AU    2008207666 A1 *  3/2009

OTHER PUBLICATIONS

Bonnie Cha, In-car GPS devices with integrated Bluetooth, cnet, Apr. 6, 2009.*

* cited by examiner

*Primary Examiner* — Khoi Tran
*Assistant Examiner* — Abby Lin

(57) ABSTRACT

A mobile advertising and performance-verification system comprising a flexible adhesive display with embedded self-contained power source and global positioning system (GPS) device to allow for tracking driver performance from a single source that calculates and disburses payment. The display is tamper-proof via perforations or other means so that its attempted relocation or removal following installation will result in disconnection of the GPS device from its power source, thus preventing fraudulent compensation. The peelable adhesive backing allows for easy installation, and its interior reveals a printed code that is sent electronically via cell phone or other electronic means along with a digital image of the installation to the single source to commence and track compensation.

13 Claims, 2 Drawing Sheets

MOBILE ADVERTISING AND COMPENSATION-VERIFICATION SYSTEM

BACKGROUND OF THE INVENTION

1. Field of Invention

This invention relates to mobile advertisements, specifically to such mobile advertisements which have a method for the verification of advertisement display and driver performance.

2. Background of the Invention

Advertising formats are evolving with technology and the appearance of new venues. Existing mobile advertisements for vehicles include private logos on company trucks, banners flown behind low-flying aircraft, drivable billboards, murals on public buses, and posters inside subways and trains. With advances in vinyl technology, advertising companies have recently established compensation systems for drivers willing to display full body advertisements or wraps on their privately owned vehicles, but this typically involves expensive and cumbersome approaches such as hand-selection of product ambassadors who drive a few vehicles along prescribed routes in order to receive compensation. As revealed in U.S. Pat. No. 6,236,330 B1 to Cohen (2001) and U.S. Pat. No. 6,850,209 B2 to Mankins et al. (2005), others have invented systems using separate global positioning systems (GPS) to automatically track and compensate the drivers of vehicles displaying ads, but this requires separate GPS installation with the further disadvantage that the GPS can operate independently from the advertisement and is therefore subject to fraudulent manipulation for increased compensation. In order to counter the potential for fraud using automated remote tracking methods, U.S. Pat. No. 6,374,228 B1 to Litwin (2002) proposes mobile display advertisements with scannable bar codes, cellular transmitters, or other identification devices embedded in the displays, but with the installation of tracking devices at individual points of sale that reward the compensation. While this latter method may help to eliminate potential fraud through automated compensation, it does not anticipate the technology necessary to allow direct tracking from a single centralized source, and requires the expensive installation of detection and verification devices at every single point of sale.

OBJECTS AND ADVANTAGES

Accordingly, several objects and advantages of the present invention are:

(a) to provide a mobile advertisement system which consists of a tamper-proof display having a self-contained power source and embedded global positioning system device (GPS) to allow tracking from a single source for compensation according to prescribed performance;

(b) to provide a mobile advertisement system which has an inexpensive and simple performance-verification system wherein individual drivers remove an adhesive backing for easy installation on a vehicle and to reveal a unique code to transmit along with a one-time installation photo-documentation via cell phone or other electronic means to a single tracking source for proof of installation.

(c) to provide a tamper-proof mobile advertisement system wherein perforations in the display cause the display to tear apart and to permanently separate the GPS from its power source if removed after installation, thereby preventing fraudulent removal to temporarily hide the display, fraudulent relocation of the display to another vehicle, or fraudulent removal and manipulation of the GPS.

Still further objects and advantages will become apparent from a consideration of the ensuing description and drawings.

SUMMARY

In accordance with the present invention, a mobile advertisement system comprises a tamper-proof display, miniature solar panel or other self-contained power means, and embedded global positioning system, with means for easy installation and performance-verification at a centralized source.

DRAWINGS

Figures

DRAWINGS

Figure 1:
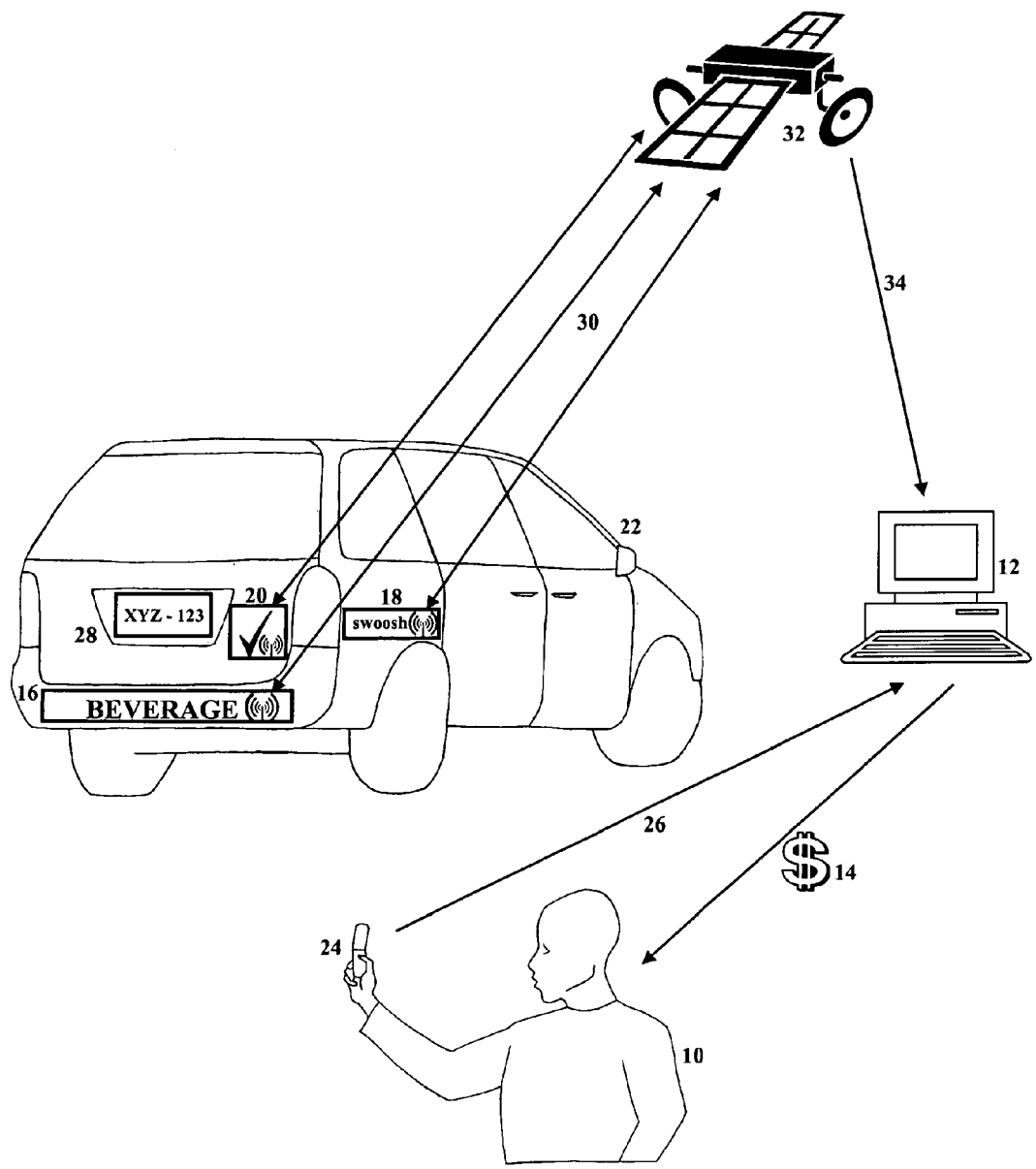
FIG. 1 shows a perspective view of the present invention in use and its relationship to the performance-verification system.

| Reference Numerals | |
| --- | --- |
| 10 registered driver | 12 computerized database at central entity |
| 14 compensation | 16 advertisement (product name) |
| 18 advertisement (product expression) | 20 advertisement (product logo) |
| 22 vehicle | 24 cell phone |
| 26 cellular transmission | 28 license plate |
| 30 GPS signals | 32 satellite |
| 34 satellite signals | 36 vinyl sticker |
| 38 clear laminate layer | 40 solar panel |
| 42 GPS microchip | 44 GPS antenna |
| 46 transmitter | 48 microcircuitry |
| 50 perforations | 52 adhesive layer |
| 54 unique printed code | |

DETAILED DESCRIPTION

Figure 2:
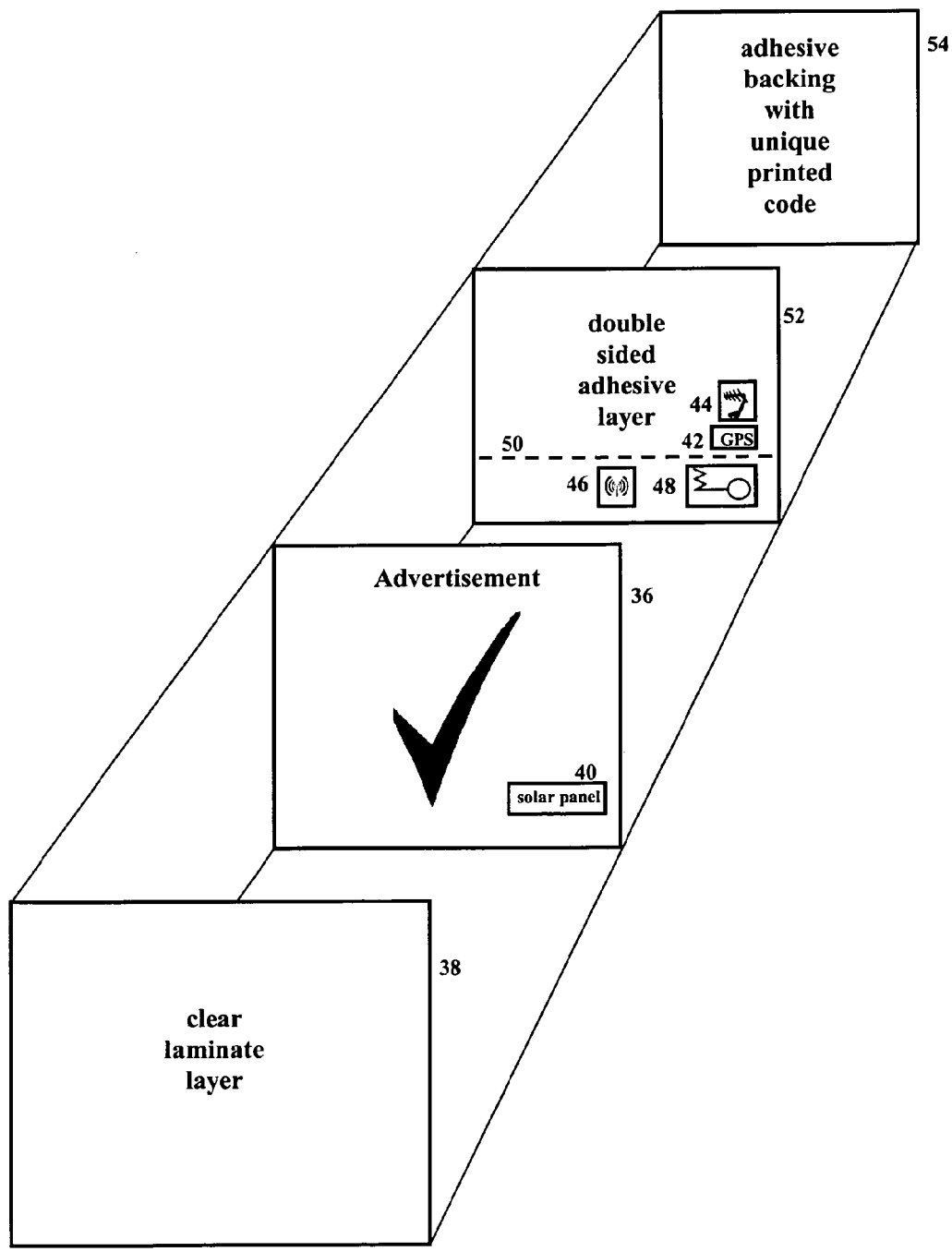
FIG. 2 shows a telescoped view of a mobile advertisement with layers to reveal internal components.

FIGS. 1, 2—Preferred Embodiment

A preferred embodiment of the mobile advertisement display system is depicted in FIG. 1 (in use) and FIG. 2 (telescoped view of layers showing internal components).

With reference to FIG. 1, the driver 10 is registered with a computerized database 12 of a centralized entity to receive compensation 14 for displaying certain advertisements 16, 18, 20 on a vehicle 22. In the preferred embodiment, the advertisement is a vinyl sticker of predetermined size and shape according to the specifications of the registered vehicle, and has adhesive backing allowing for easy installation by the driver. The driver verifies installation through recording a digital image, by cell phone 24 picture in the preferred embodiment, thereby allowing for easy transmission 26 to the centralized entity and its computerized database for verification. An agent of the centralized entity may review the photo which shows installation of the sticker on the vehicle, as well as the number of its registered license plate 28. When the image is sent by cellular phone to the centralized entity, it is accompanied by a text message containing the specific code for the particular advertisement to further verify installation. As the registered vehicle is driven, an internal global positioning system (GPS) device within the advertisement receives signals 30 from a satellite 32 and in turn via satellite sends signals 34 about relevant vehicle performance and location information directly to the centralized entity and its computer database.

In the preferred embodiment, the performance and location information for which advertisers will pay is mileage driven, and therefore valuable exposure of the advertisements, but could also be based on routes driven, number of passes by a particular location, or any other number of performance criteria as measured by position or movement. In the preferred embodiment, the central entity is an advertising agency which creates a computer program that matches drivers with predetermined selection criteria set by advertising sponsors depending on the demographics of the driver and type of vehicle used to display the advertisement. The preferred embodiment also provides a simple way for the driver to install the advertisement and verify its proper placement without incurring the costs of professional installers or verification devices at particular points of sale.

FIG. 2 shows a dissected view of an advertisement display 36. On the surface of the advertisement, or under a transparent outer layer 38, a solar panel 40 or other self-contained power source provides power for the system. Beneath the surface of the advertisement, a thin GPS microchip 42, antenna 44, and transmitter 46, are connected to the power source via microcircuitry 48. Perforations 50 or other tamper-proof means in the advertisement result in the tearing apart of the ad and permanent breaching of the microcircuitry or disconnection of the GPS microchip from its power source if the advertisement is removed after initial installation, thereby providing a means of preventing fraudulent removal or relocation of the advertisement or fraudulent manipulation of the GPS microchip. In the preferred embodiment, the GPS microchip and its microcircuitry are hidden from view behind the advertisement, and overlie a double-sided adhesive layer 52 that holds the GPS microchip in place and also allows for easy installation. Ideally, the adhesive has qualities of firmly attaching the advertisement to the vehicle, but is removable and avoids damage to the surface of a vehicle. An adhesive backing protects the adhesive surface that is mounted to the vehicle, but also has a unique printed code 54 on the interior surface of the backing that is only revealed when the backing is removed. In the preferred embodiment or method of use, the unique code is sent by cellular text along with the installation photo shown in FIG. 1 for installation verification by the centralized entity or advertising agency. The preferred embodiment of FIG. 2 shows aspects of the invention related to ease of installation, reduced cost, and security with respect to performance verification. Other embodiments could also be derived to accomplish these same goals. Regarding ease of installation, the advertisement display in other embodiments could be magnetized, adhering to metal surfaces of a vehicle. Magnetic attachment would provide another simple method of installation that would avoid the costs associated with a professional installer. The preferred embodiment also has a solar panel as the self-contained power source, although long-life batteries could be used as well. Regarding costs and power requirements, alternative embodiments may utilize the assistance of a cellular network or relay system consisting of a bluetooth component and cell phone to transmit location information. A microcontroller may be included in the GPS device to assist in the calculation and interpretation of location information. Also, an eeprom device or flash memory chip may be incorporated into the GPS device for storing location information and distance data when the GPS device is not being powered, thereby eliminating risk of location information loss. In another alternative embodiment, the GPS device is contained within the cell phone or other personal electronic data device of the driver or vehicle, and communicatively linked with a bluetooth component in the tamper-proof material of the advertisement. Perforations serve as principal form of tamper resistance, although other methods could include chemical reaction in the adhesive when exposed to light or other conditions. The tamper-proof material may also be translucent or feature perforations to allow for driver visibility through windows or windshields.

Finally, the preferred embodiment of the present invention uses a GPS unit to provide trackability and verification of driver performance, although the scope of the present invention covers all mobile advertisements utilizing any embedded tracking system that remotely provides performance information to a centralized source, as determined by the appended claims and their legal equivalents.

I claim:

1. A mobile advertising and performance-verification system, comprising:
   a) a tamper-proof material having means for installing on a surface of a vehicle;
   b) a display on a surface of the tamper-proof material, wherein said display comprises an advertisement;
   c) a global positioning system (GPS) device embedded within said tamper-proof material;
   d) a self-contained power source embedded within said tamper-proof material and communicatively linked with said GPS device;
   e) means for self-verification of installation;
   f) whereby when said vehicle is driven by a registered driver, said GPS device via embedded electronic components communicates with a centralized computer to track vehicle performance and calculate compensation for displaying said advertisement based on tracked location information; and
   g) wherein the tamper-proof material contains perforations to disrupt the link between said self-contained power source and said GPS device upon tampering.

2. The system of claim 1, wherein said means for installing on the surface of the vehicle comprises vinyl with adhesive backing.

3. The system of claim 1, wherein said GPS device comprises a microchip, an antenna, a transmitter, and microcircuitry.

4. The system of claim 1, wherein said centralized computer matches registered drivers with appropriate advertisements based on predetermined selection criteria set by advertising sponsors.

5. The system of claim 1, whereby said compensation is calculated based on vehicle performance criteria such as miles driven or venues visited.

6. The system of claim 1, wherein said compensation is direct deposit of funds, check, redeemable coupons, tickets of admission, or entry into sweepstakes drawings.

7. The system of claim 1, wherein the self-contained power source comprises a solar panel or long-life battery.

8. The system of claim 1, wherein said means for self-verification of installation comprises transmission of an electronic message to said centralized computer, wherein said electronic message comprises an image of the vehicle license plate and text message containing a uniquely assigned code only revealed upon installation of the advertisement.

9. The system of claim 1, wherein said GPS device transmits location information through a cellular network.

10. The system of claim 1, wherein a transmitter of said GPS device comprises a bluetooth technology communicatively linked with said GPS device and a cell phone or other personal electronic device of the driver or vehicle for transmission of said location information to said centralized computer.

11. The system of claim 1, further comprising a microcontroller unit for calculating and interpreting location information derived from the GPS device.

12. The system of claim 1, further comprising a non-volatile data storage device such as an eeprom or flash memory chip for storing said location information and distance data.

13. The system of claim 1, wherein said self-contained power source comprises a primary power source and a back-up power source, wherein said primary power source comprises a solar panel, and wherein said back-up power source comprises a long-life battery or capacitor.

\* \* \* \* \*